Aug. 31, 1926.

F. OSWALD 1,598,497

DEVICE FOR ADVERTISING PURPOSES

Filed Nov. 5, 1925

Inventor:
Fitz Oswald
by Jo Moeller
atty.

Patented Aug. 31, 1926.

1,598,497

UNITED STATES PATENT OFFICE.

FRITZ OSWALD, OF FRANKFORT-ON-THE-MAIN, GERMANY.

DEVICE FOR ADVERTISING PURPOSES.

Application filed November 5, 1925, Serial No. 66,907, and in Germany September 15, 1924.

The invention has for its object to provide a useful and highly effective advertising device.

This object is attained by giving to the indicating elements of a measuring instrument, such as a timepiece, the appearance of an organ or feature of a mechanical figure or face.

The annexed drawings show mechanism whereby the invention may be carried into effect, but are to be considered as illustrative rather than limiting.

Figures 1, 2, 3:
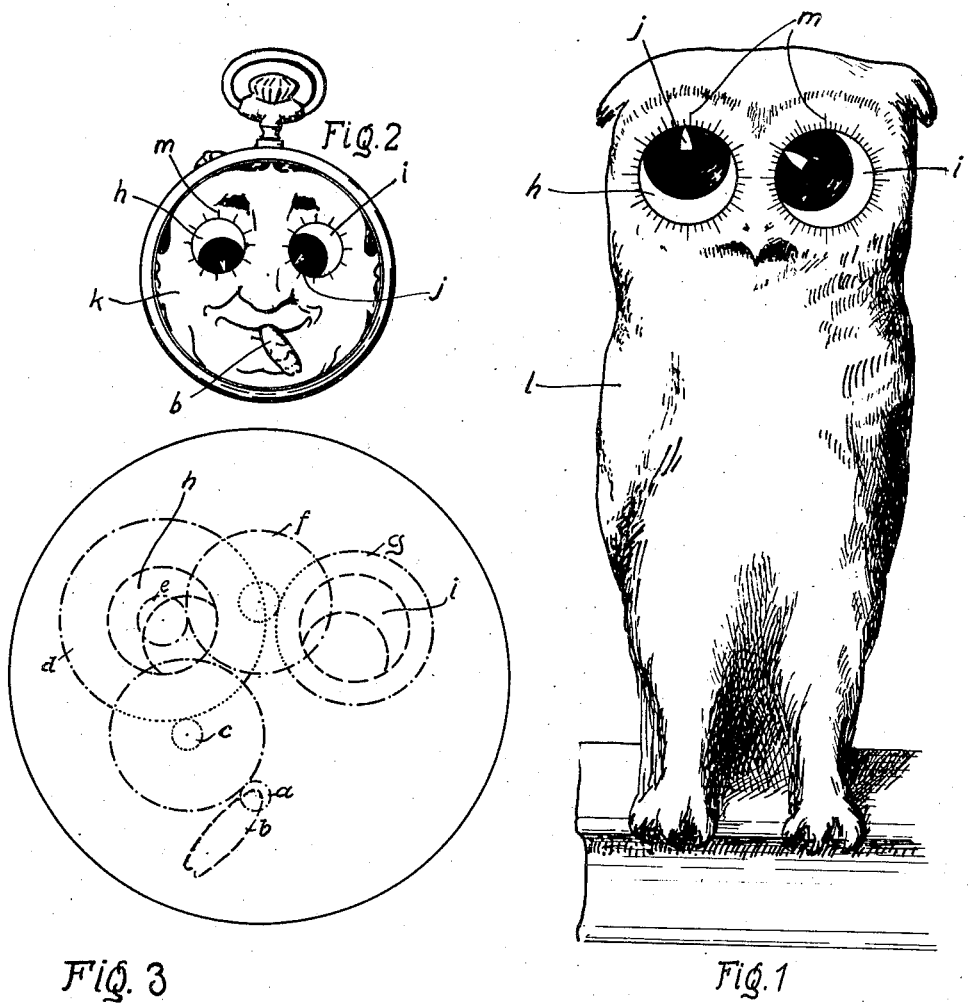
Fig. 1 is an elevation showing a mechanical figure wherein the eyes are adapted to register hours and minutes respectively.
Fig. 2 shows a modification having members adapted to register hours, minutes and seconds.
Fig. 3 is an enlarged detail of the actuating mechanism of Fig. 2.

Referring more particularly to Fig. 1, the figure $l$ is a representation of an owl, and is adapted to contain clockwork for actuating the movable disks $h$ and $i$, each of which represents an eye and carries an index mark $j$, which cooperate with scales $m$ to register the time, disk $h$ registering the hours and disk $i$ the minutes. The mechanism for rotating disks $h$ and $i$ in a clockwise direction is similar to that shown in Fig. 3.

In Fig. 2 is shown a watch having a dial which simulates a human face, wherein disks $h$ and $i$ register hours and minutes respectively, while an index $b$, simulating a cigar, registers the seconds. The movable features, $h$, $i$, and $b$, are actuated by a train of gears and pinions $g$, $f$, $e$, $d$, $c$, and $a$ geared in the ratio of 3600:60:1 and driven by the usual watchwork.

Instead of a timepiece, any measuring instrument, such as a thermometer or barometer may be employed as the prime mover.

An advantage of the present invention over known advertising devices having a timepiece or thermometer as one feature thereof lies in the fact that in the present device it is impossible to read the time or temperature and ignore the remainder of the advertisement, since the indicating members are features of the figure itself.

What I claim is:—

1. In an advertising device, the combination with a measuring instrument, of a figure having movable features, indicating marks on said figure and connecting means between said instrument and said features, whereby the quantity being measured is registered by the position of said features relative to said indicating marks.

2. In an advertising device, the combination with a measuring instrument, of a mechanical figure having movable members, the movement of which calls attention to the device, said members being connected to the moving parts of said instrument to be actuated thereby, indicating marks on said figure adapted to cooperate with said members and to thereby register the quantity being measured.

Signed at Frankfort-on-the-Main, in the Republic of Germany, this 17th day of October, A. D., 1925.

FRITZ OSWALD.